United States Patent
Monde et al.

(10) Patent No.: US 11,635,721 B2
(45) Date of Patent: Apr. 25, 2023

(54) METHOD FOR DETERMINING TYPE OF SHEET BY IMAGING SHEET

(71) Applicant: CANON KABUSHIKI KAISHA, Tokyo (JP)

(72) Inventors: Masafumi Monde, Kawasaki (JP); Mizuki Ishimoto, Numazu (JP); Yu Miyajima, Utsunomiya (JP); Norio Matsui, Mishima (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/568,748

(22) Filed: Jan. 5, 2022

(65) Prior Publication Data

US 2022/0128938 A1    Apr. 28, 2022

Related U.S. Application Data

(63) Continuation of application No. 16/835,731, filed on Mar. 31, 2020, now Pat. No. 11,249,429.

(30) Foreign Application Priority Data

Apr. 8, 2019   (JP) .............................. JP2019-073719

(51) Int. Cl.
*G01N 21/55*      (2014.01)
*G03G 15/00*      (2006.01)
(Continued)

(52) U.S. Cl.
CPC ....... *G03G 15/5029* (2013.01); *G02B 17/086* (2013.01); *G02B 17/0876* (2013.01);
(Continued)

(58) Field of Classification Search
CPC .......... G03G 15/04036; G03G 15/043; G03G 15/5029; G02B 17/086; G02B 17/0876; H05B 47/115; G01N 21/55
See application file for complete search history.

(56) References Cited

U.S. PATENT DOCUMENTS 6,668,144 B2   12/2003  Maruyama
8,750,732 B2    6/2014  Ishii
(Continued)

FOREIGN PATENT DOCUMENTS

CN        1359034 A     7/2002
CN      101909131 A    12/2010
(Continued)

OTHER PUBLICATIONS

Chinese Office Action dated May 23, 2022 during prosecution of related Chinese application No. 202010257488.1 (English-language translation not available.).
(Continued)

*Primary Examiner* — Hoang X Ngo
(74) *Attorney, Agent, or Firm* — Venable LLP

(57) ABSTRACT

A first light guide guides first light in a first light guiding path. The first light is of light irradiated from the light source to a sheet. A first detection unit receives reflected light from the sheet and outputs an image signal indicating an image of a surface of the sheet. A second light guide guides second light in a second light guiding path different from the first light guiding path. The second light is of the light irradiated from the light source and is different from the first light. A second detection unit receives the second light and output a detection signal corresponding to a light amount of the second light. A control unit controls a light emission amount of the light source based on the detection signal.

34 Claims, 11 Drawing Sheets

(51) Int. Cl.
*H05B 47/115* (2020.01)
*G03G 15/04* (2006.01)
*G02B 17/08* (2006.01)
*G03G 15/043* (2006.01)

(52) U.S. Cl.
CPC ..... *G03G 15/043* (2013.01); *G03G 15/04036* (2013.01); *H05B 47/115* (2020.01)

(56) References Cited

U.S. PATENT DOCUMENTS

| | | |
|---|---|---|
| 9,157,853 B2 | 10/2015 | Ishii |
| 2002/0071688 A1 | 6/2002 | Maruyama |
| 2010/0310264 A1 | 12/2010 | Ishida |
| 2013/0057861 A1 | 3/2013 | Ishii |
| 2014/0037351 A1 | 2/2014 | Matsui |
| 2014/0246590 A1 | 9/2014 | Ishii |
| 2018/0329348 A1* | 11/2018 | Miyajima .......... G03G 15/5029 |

FOREIGN PATENT DOCUMENTS

| | | |
|---|---|---|
| CN | 106681111 A | 5/2017 |
| JP | 2002-182518 | 6/2002 |
| JP | 2005-212185 A | 8/2005 |
| JP | 2011-13300 | 1/2011 |
| JP | 2013-57513 | 3/2013 |
| JP | 2014-99918 A | 5/2014 |
| JP | 2018-189573 | 11/2018 |

OTHER PUBLICATIONS

Japanese Office Action dated Dec. 23, 2022 during prosecution of related Japanese application No. 2019-073719 (English-language translation included.).

* cited by examiner

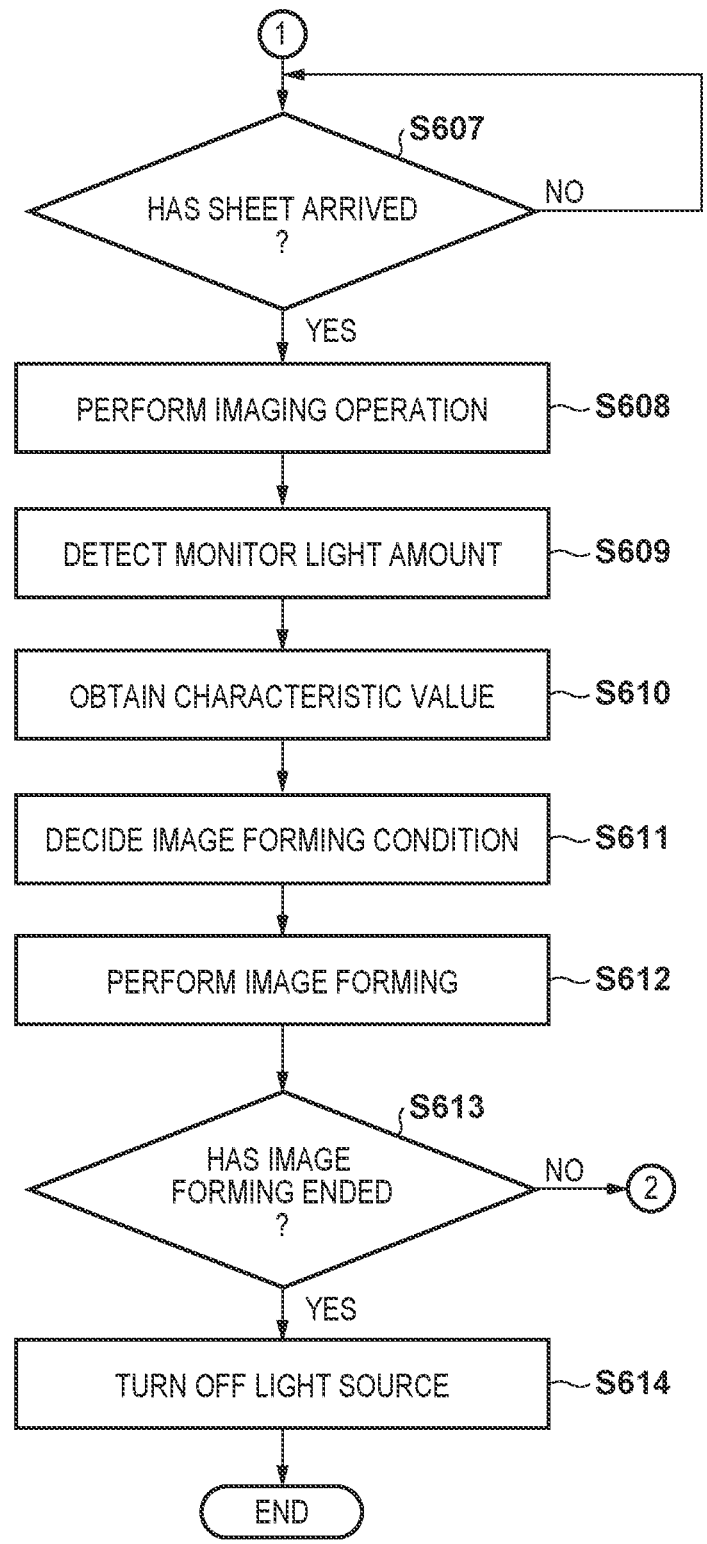

METHOD FOR DETERMINING TYPE OF SHEET BY IMAGING SHEET

This application is a continuation of U.S. application Ser. No. 16/835,731, filed Mar. 31, 2020, and claims priority under 35 U.S.C. § 119 to Japanese Application No. 2019-073719, filed on Apr. 8, 2019, the contents of each of which are incorporated by reference herein.

BACKGROUND OF THE INVENTION

Field of the Invention

The present invention relates to a method of determining a type of a sheet by imaging the sheet.

Description of the Related Art

There are various image forming methods such as an electrophotographic method and an ink-jet method. Regardless of the method, image reproducibility is improved by adjusting an image forming condition in accordance with a sheet type (e.g., a permeability or surface property). A sheet determination device for determining a sheet type generally has a light source for irradiating a sheet with light and a light receiving element for receiving reflected light from the sheet. The sheet type is determined on the basis of an output signal of a light receiving element (Japanese Patent Laid-Open No. 2002-182518).

In order to accurately determine the type, it is necessary to correct a light amount of the illumination light irradiated onto a surface of the sheet to a target light amount. According to Japanese Patent Laid-Open No. 2011-013300, a light amount correction is performed based on reflected light from an inner surface reference plate disposed between a light source and a sheet.

However, in the prior art, since an inner surface reference plate is required, the cost of the inner surface reference plate is incurred. In addition, since work to mount the inner surface reference plate is necessary, a cost associated with the increase in the number of work steps is also necessary.

SUMMARY OF THE INVENTION

The present invention provides a sheet imaging apparatus comprising the following elements. A light source. A first light guide is configured to guide first light in a first light guiding path. The first light is of light irradiated from the light source to a sheet. A first detection unit is configured to receive reflected light from the sheet and output an image signal indicating an image of a surface of the sheet. A second light guide is configured to guide second light in a second light guiding path different from the first light guiding path. The second light is of the light irradiated from the light source and is different from the first light. A second detection unit is configured to receive the second light and output a detection signal corresponding to a light amount of the second light. A control unit is configured to control a light emission amount of the light source based on the detection signal.

Further features of the present invention will become apparent from the following description of exemplary embodiments (with reference to the attached drawings).

BRIEF DESCRIPTION OF THE DRAWINGS

FIGS. 6A and 6B are a flowchart illustrating an image forming method.

DESCRIPTION OF THE EMBODIMENTS

Figure 1:
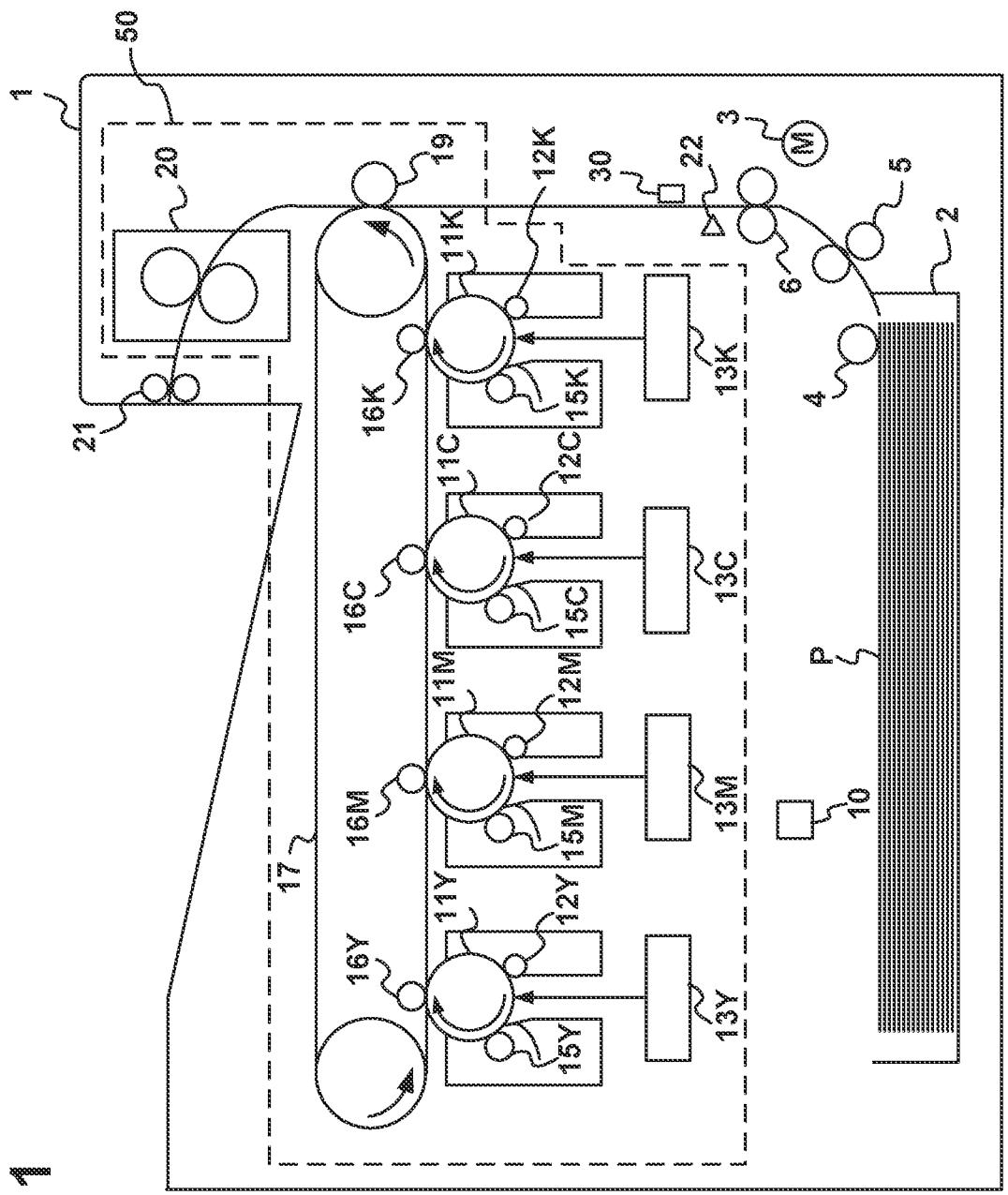
FIG. 1 is a diagram for describing an image forming apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

[Image Forming Apparatus]

As shown in FIG. 1, an image forming apparatus 1 is an electrophotographic printer. An image forming unit 50 forms a color image by superimposing developers (toners) of four colors of yellow (Y), magenta (M), cyan (C), and black (K). In FIG. 1, a character of Y, M, C, and K indicating a toner color is added to the end of a reference numeral, but Y, M, C, and K characters are omitted when matters common to the four colors are described.

A feeding cassette 2 is a storage for storing sheets P. The feeding roller 4 feeds a sheet P from the feeding cassette 2 to the conveyance path. The conveyance roller pair 5 conveys the sheet P fed from the feeding cassette 2 further downstream in the conveyance direction of the sheet P. A registration roller pair 6 are conveyance rollers for aligning the timing at which the sheet P arrives at the secondary transfer roller 19 with the timing at which a toner image arrives at the secondary transfer roller 19. A sheet sensor 22 is provided in the vicinity of the registration roller pair 6, and detects the arrival timing of the sheet P.

In the image forming unit 50, a photosensitive drum 11 is an image carrier for carrying an electrostatic latent image or a toner image. A charging roller 12 charges the surface of the photosensitive drum 11 so that the surface potential of the photosensitive drum 11 becomes a uniform potential. An exposure device 13 forms an electrostatic latent image by irradiating the surface of the photosensitive drum 11 with light. A developing device 15 develops the electrostatic latent image using toner to form a toner image. A primary transfer unit 16 transfers the toner image to an intermediate transfer member 17. The secondary transfer roller 19 transfers the toner image from the intermediate transfer member 17 to the sheet P. A fixing device 20 fixes the toner image on the sheet P using heat and pressure. A discharge roller 21 discharges the sheet P to a tray provided outside the image forming apparatus 1.

A sheet determination device 30 determines the type of the sheet P conveyed along the conveyance path. Here, the type is determined by specifying a type name or obtaining a characteristic value indicating a characteristic of the sheet P (for example: surface property, basis weight, permeability, or the like). A control unit 10 controls the motor M to adjust the conveyance speed of the sheet P. For example, in the case of a sheet P (cardboard) having a large basis weight, the conveyance speed is made relatively slow. For sheets P of low basis weight (plain paper and thin paper) the conveyance speed is made to be relatively high. That is, the control unit 10 may control the motor M according to the type of the sheet P determined by the sheet determination device 30. In addition, the control unit 10 may control the temperature of the fixing device 20 according to the type of the sheet P determined by the sheet determination device 30. In addition, the control unit 10 may control the transfer voltage applied to the primary transfer unit 16 and the secondary transfer roller 19 according to the type of the sheet P determined by the sheet determination device 30. These are generally referred to as image forming conditions.

The type of the sheet P is not limited to a basis weight, and may include a surface property. Coated paper is an example of a sheet P having a smooth surface. Bond paper is an example of a sheet P having a coarse surface. An electrical resistance value of the sheet P differs depending on the surface property. A transfer condition for transferring a toner image (for example, a transfer current) is controlled in accordance with the surface property determined by the sheet determination device 30. The fixing temperature for a sheet P having a smooth surface is lower than the fixing temperature for a sheet P having a rough surface. In other words the fixing process time for a sheet P having a smooth surface is shorter than the fixing process time for a sheet P having a rough surface. Therefore, the control unit 10 controls image forming conditions in accordance with the surface properties determined by the sheet determination device 30.

[Sheet Determination Device]

Figure 2A:
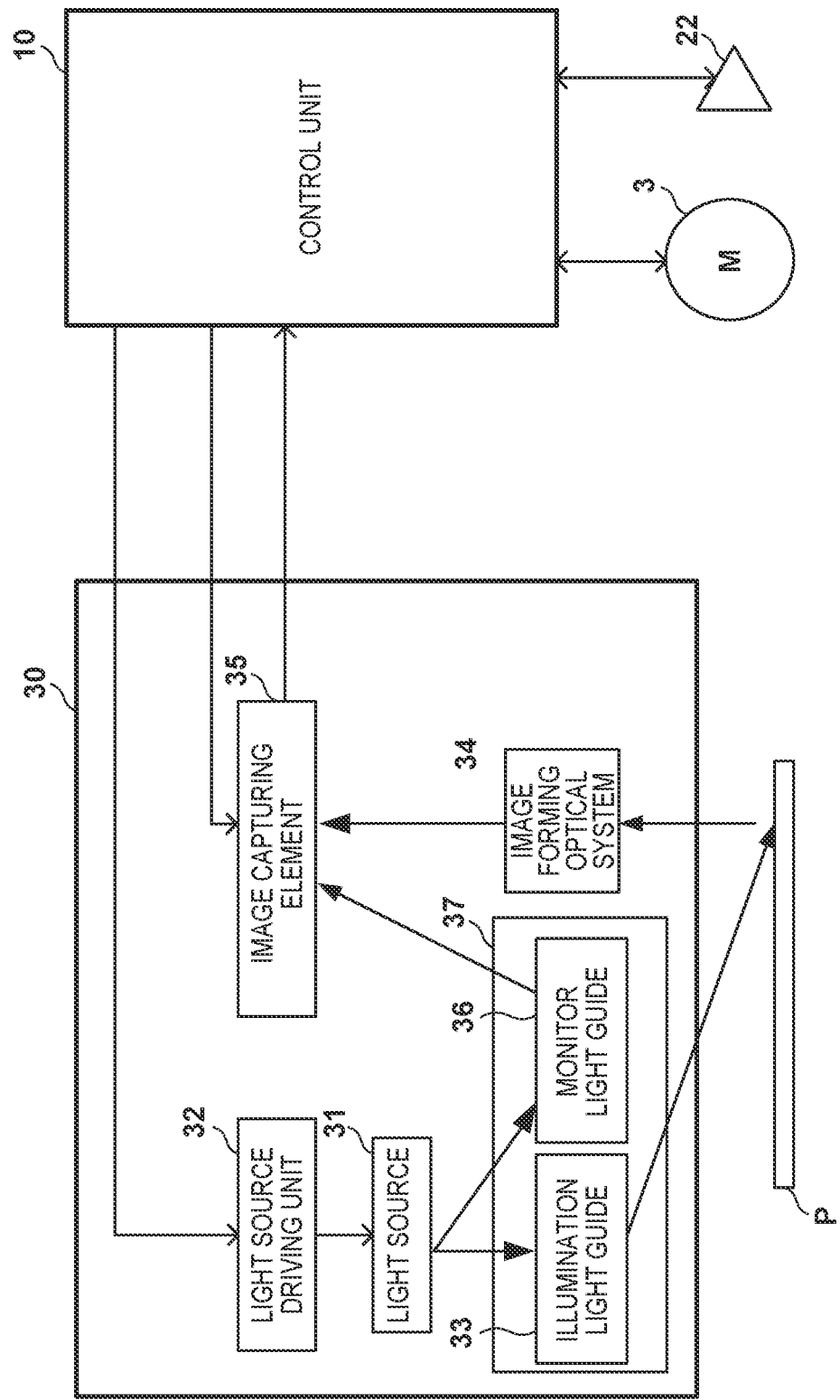
FIGS. 2A and 2B are diagrams for describing a sheet determination device.

As shown in FIG. 2A, a sheet image capturing apparatus in the sheet determination device 30 includes a light source 31, a light source driving unit 32, an illumination light guide 33, an image forming optical system 34, an image capturing element 35, a monitor light guide 36, and the like. The illumination light guide 33 and the monitor light guide 36 are integrated to form an optical component 37. In the present embodiment, the illumination light guide 33 and the monitor light guide 36 are integrated, but this is merely an example. The illumination light guide 33 and the monitor light guide 36 may be independent (separate) from each other.

When a lighting start condition is satisfied, the control unit 10 instructs the light source driving unit 32 to turn on the light source 31. In addition, the control unit 10 designates a light emission amount to the light source driving unit 32. The light source driving unit 32 supplies a drive current (hereinafter, referred to as ILED) corresponding to the designated light emission amount) to the light source 31. The light source 31 is, for example, a light emitting diode. A luminous flux is emitted radially with a normal direction with respect to a light emitting surface of the light source 31 as an optical axis. Generally, there is a linear relationship between the light emission amount of the light source 31 and the drive current ILED. The control unit 10 adjusts the drive current ILED so that an amount of light indicated by a detection signal outputted from the image capturing element 35 becomes a target amount of light.

Since the light outputted from the light source 31 has a spread, a part of the light is incident on the illumination light guide 33 so as to be illumination light, and another part is incident on the monitor light guide 36 so as to be monitor light. The illumination light guide 33 is an optical component formed of resin, and guides the illumination light outputted from the light source 31 to the surface of the sheet P. The monitor light guide 36 guides the monitor light outputted from the light source 31 to the image capturing element 35. The image forming optical system 34 forms an image of reflected light resulting from the illumination light being reflected by the surface of the sheet P on the image capturing element 35.

The image capturing element 35 is an image sensor that receives light that has passed through the image forming optical system 34 and outputs an image signal. The image capturing element 35 receives the monitor light and outputs an image signal (a detection signal) corresponding to the light amount of the monitor light. In the present embodiment, the image capturing element 35 is a CMOS (Complementary Metal Oxide Semiconductor) sensor. That is, the image capturing element 35 has a plurality of light receiving elements (light receiving pixels) arranged in a line. Here, the direction in which the plurality of light receiving elements are arranged and the conveyance direction of the sheet P are orthogonal to each other. The control unit 10 outputs a control signal (a trigger signal) for causing the image capturing element 35 to perform imaging. Each time a trigger signal is inputted, the image capturing element 35 performs imaging and outputs an image signal to the control unit 10. The accumulation time of the image capturing element 35 may be set in accordance with the resolution of a surface image in the conveyance direction of the sheet P. Before imaging the sheet P, the control unit 10 may acquire dark current data by turning off the light source 31 and causing the image capturing element 35 to perform imaging. The control unit 10 may remove noise such as disturbance light from the image signal using the dark current data when performing the determination of the sheet P. In order to cancel the influence of unevenness in the amount of light irradiated on the sheet P, unevenness in the light receiving sensitivity of the image capturing element 35, and the like, the control unit 10 may perform a shading correction. As a result, the accuracy of determining the surface property may be improved. In the present embodiment, such correction may be included in an imaging operation. As the image capturing element 35, a CCD (Charge Coupled Device) sensor, a photo diode, or the like may be employed. In the image capturing element 35, a plurality of pixels may be arranged over two or more columns.

The control unit 10 determines the type of the sheet P based on the image signal outputted from the image capturing element 35. For example, the control unit 10 calculates a characteristic value of a surface property of the sheet P from variation of a plurality of reception levels obtained by a plurality of imaging operations. The control unit 10 may determine the type of the sheet P by comparing the characteristic value of the surface property with a plurality of thresholds. The calculation of the characteristic value of the surface property may be obtained by using, for example, the maximum value or the minimum value of the variation of the reception level, or an absolute value of the difference thereof. Any calculation method may be employed as long as a characteristic amount capable of determining the type of the sheet P can be calculated. The control unit 10 decides an image forming condition based on the determination result. The control unit 10 controls the rotation speed of a motor 3 based on the image forming condition.

The sheet sensor 22 is disposed between the registration roller pair 6 and the sheet determination device 30. Based on the detection signal from the sheet sensor 22, the control unit 10 determines whether or not the sheet P passes through a predetermined position in the conveyance path. The sheet sensor 22 is an optical sensor, and detects the presence/absence of the sheet P by shielding/passing light from the sheet P. The sheet sensor 22 may be another sheet sensor, such as an ultrasonic sensor.

Figure 2B:
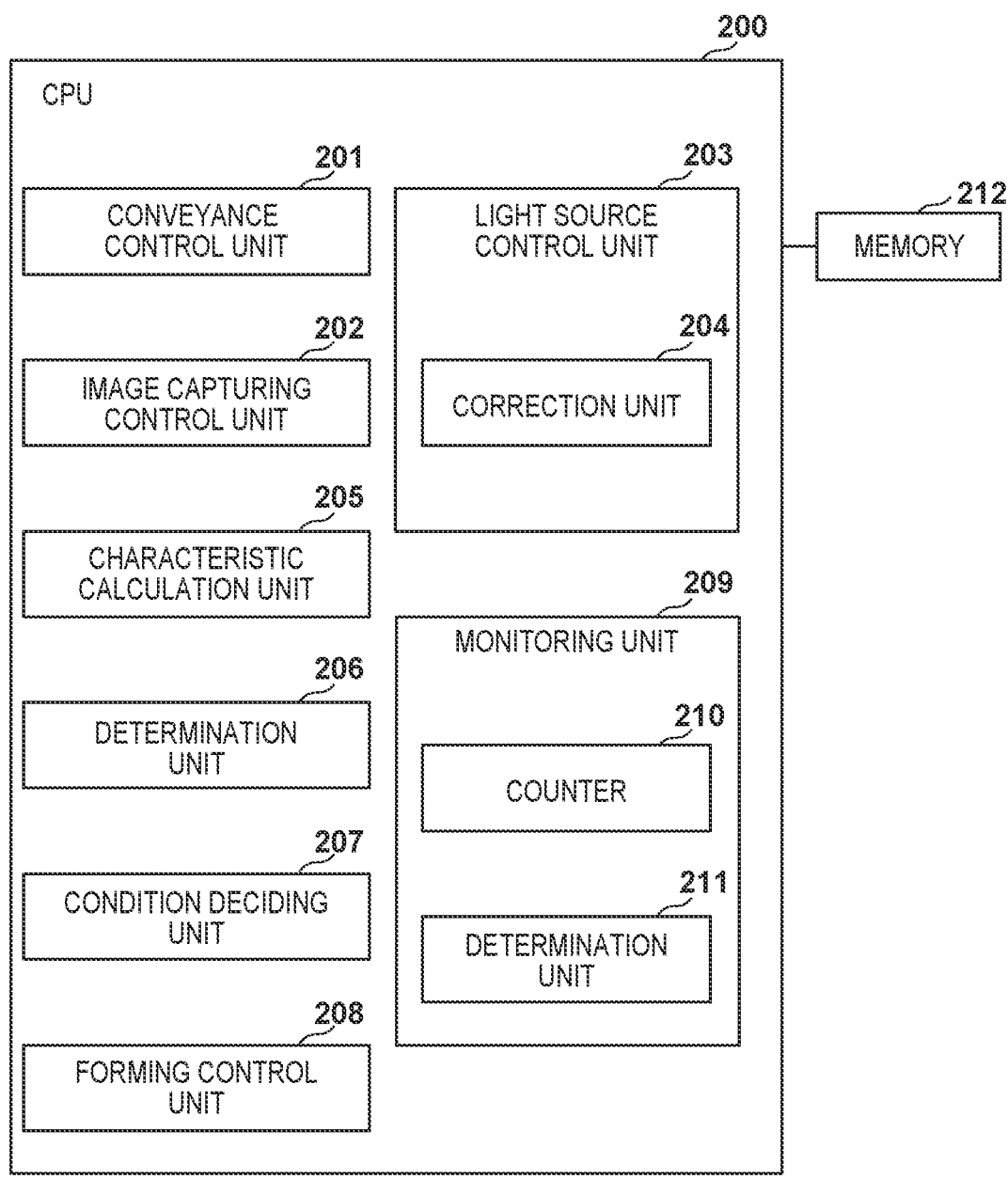

FIG. 2B shows elements that configure the control unit 10. A CPU 200 implements various functions by executing control programs stored in the memory 212. For example, a conveyance control unit 201 controls the conveyance speed of the sheet P by controlling the rotation speed of the motor 3. An image capturing control unit 202 outputs a trigger signal to the image capturing element 35 to thereby cause the image capturing element 35 to perform image capturing. A light source control unit 203 controls turning on/off of the light source 31, and controls the amount of light emitted from the light source 31. In particular, a correction unit 204 corrects the light emission amount of the light source 31 in accordance with a light amount of the monitor light detected by the image capturing element 35. A characteristic calculation unit 205 calculates a characteristic value indicating a surface property of the sheet P based on the image signal outputted from the image capturing element 35. A determination unit 206 determines the type of the sheet P based on a calculation result output from the characteristic calculation unit 205. A condition deciding unit 207 decides an image forming condition based on the calculation result output from the characteristic calculation unit 205 or the type of the sheet P. A forming control unit 208 controls the image forming unit 50 in accordance with the image forming condition. A monitoring unit 209 monitors the position of the sheet P in the conveyance path. A counter 210 counts the drive amount of the motor M (for example, the number of steps). A determination unit 211 determines whether or not the sheet P has arrived at the predetermined position based on a count value of the counter 210.

Figure 3A:
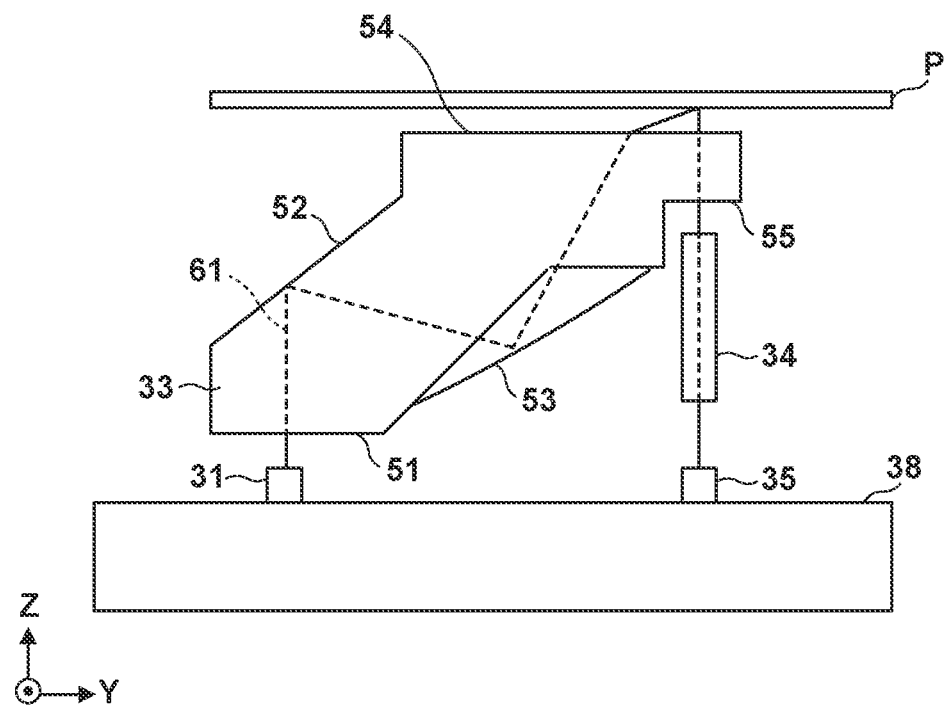
FIGS. 3A and 3B are diagrams for describing a light guide.
Figure 3B:
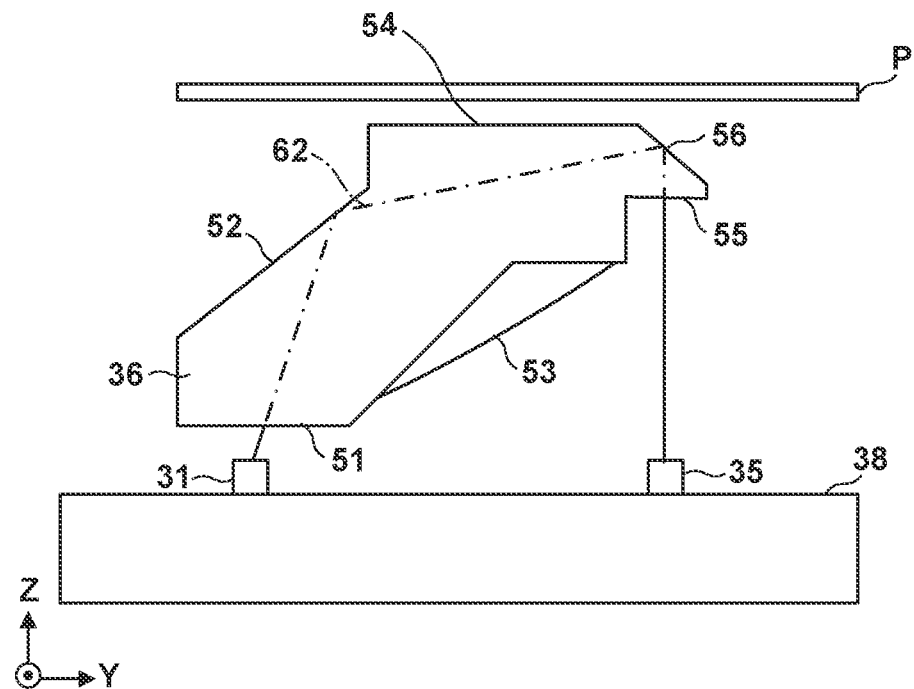
Figure 4:
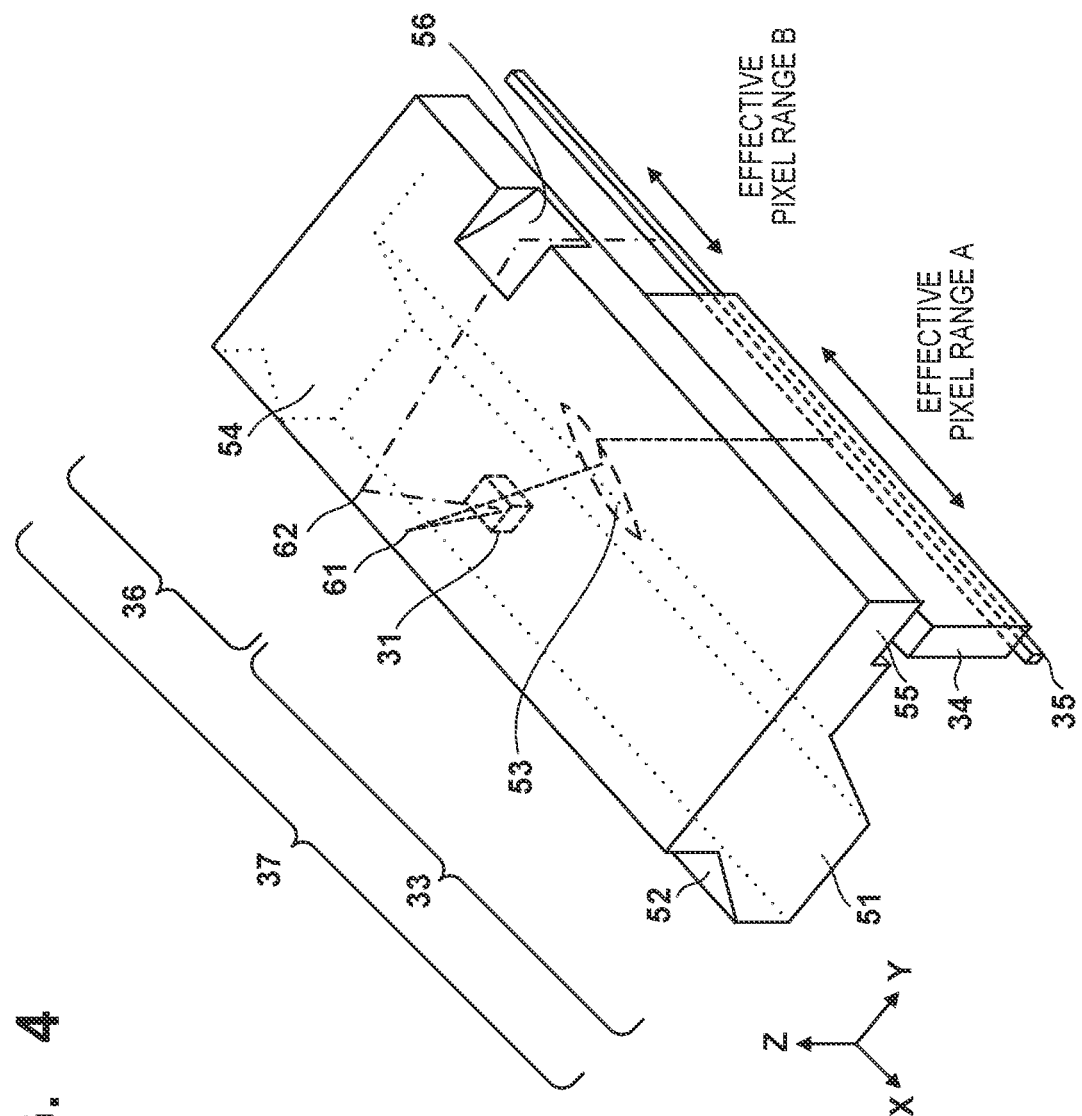
FIG. 4 is a diagram for describing a light guide.

FIG. 3A is a cross-sectional view of the illumination light guide 33 of the sheet determination device 30. FIG. 3B is a cross-sectional view of the monitor light guide 36 of the sheet determination device 30. FIG. 4 is a perspective view of the optical component 37. Here, depiction of a housing (upper lid or holding portion) is omitted in order to describe an arrangement in an easy to understand manner. The sheet determination device 30 holds the optical component 37 and the image forming optical system 34 on the housing. Note that the X-axis direction is a direction parallel to a direction in which a plurality of light receiving elements are arranged in the image capturing element 35. The Y-axis direction is a direction parallel to the conveyance direction of the sheet P. The Z-axis direction is a normal direction of an electric substrate 38.

As shown in FIG. 3A, the light source 31 and the image capturing element 35 are mounted on the electric substrate 38. The electric substrate 38 is fixed to the housing by screws. So that dust, paper powder, and the like does not enter the housing, the housing and the optical component 37 are installed without a gap therebetween. A first optical path 61 is an optical path through which the illumination light passes. The first optical path 61 is indicated by solid lines and dashed lines. A second optical path 62 is an optical path through which the monitor light passes. The second optical path 62 is indicated by dashed-dotted lines and solid lines. The solid lines mean being visible from each viewpoint. The dashed lines and dashed-dotted lines mean not visible from each viewpoint. Here, only a portion of the light rays are illustrated, and luminous flux has a number of light rays passing through various optical paths.

As shown in FIG. 3A and FIG. 4, the illumination light guide 33 has an illumination optical system and a light receiving optical system. The illumination optical system includes an incidence surface 51, a reflection surface 52, a reflection surface 53, and a conveyance front surface 54. The light receiving optical system has a conveyance front surface 54 and a conveyance back surface 55. As shown in FIG. 3B and FIG. 4, the monitor light guide 36 has the incidence surface 51, a reflection surface 52, a reflection surface 56, and the conveyance back surface 55.

Illumination Light

As shown in FIG. 3A and FIG. 4, the illumination light, which is a part of the light emitted from the light source 31, enters the interior of the illumination light guide 33 from the incidence surface 51, is deflected by the reflection surface 52, and is deflected again by the reflection surface 53, which is a curved surface. Here, the illumination light is collimated. Further, the illumination light is emitted from the conveyance front surface 54 to the outside of the illumination light guide 33, and is irradiated onto a sheet P present as a surface to be irradiated. By irradiating the sheet material with the collimated luminous flux, it is possible to more efficiently obtain the characteristic value of the surface property of the sheet material as compared with the case of the divergent luminous flux. In the illumination optical system according to the embodiment, the incident angle formed by the projected luminous flux of the illumination luminous flux (the luminous flux projected onto an XY plane parallel to the sheet P) and the conveyance direction (Y direction) of the sheet P is 45 degrees. However, the incident angle can be appropriately set depending on a type of unevenness on the surface of the sheet P, and may be, for example, 0 degrees or 90 degrees. At this time, by increasing the incident angle of the illumination light (to more than 45 degrees), shadow due to the unevenness of the surface of the sheet P is emphasized, and the determination accuracy of the sheet P is improved. Part of the scattered light from the sheet P which is present as a surface to be irradiated enters the inside of the illumination light guide 33 again from the conveyance front surface 54 as reflected light originating as the illumination light, and is emitted to the outside of the illumination light guide 33 again from the conveyance back surface 55. Further, the reflected light caused by the illumination light passes through the image forming optical system 34 and forms an image on an effective pixel range A in the image capturing element 35.

Monitor Light

As shown in FIG. 3B and FIG. 4, the monitor light, which is another part of the light emitted from the light source 31, enters the inside of the monitor light guide 36 from the incidence surface 51 of the monitor light guide 36. The monitor light is deflected by the reflection surface 52, further deflected by the reflection surface 56, and is emitted from the conveyance back surface 55 to the outside of the monitor light guide 36. The monitor light is incident on an effective pixel range B in the image capturing element 35.

In the present embodiment, the effective pixel range B in the image capturing element 35 is employed as a light receiving element for receiving the monitor light, but this is merely an example. The effective pixel range B may be realized by another light receiving element (photoelectric conversion element) different from the image capturing element 35. The control unit 10 sets a maximum value of the light amount of the monitor light irradiated onto the effective pixel range B as the monitor light amount. For example, from a plurality of light receiving elements configuring the effective pixel range B, light amounts of respective light receiving elements that have been respectively obtained are compared with each other, and the maximum value is decided. The control unit 10 can detect variation in the light amount of the light source 31 based on the monitor light amount. If the variation of the amount of light is small, the surface of the sheet P is smooth. If the variation of the amount of light is large, the surface of the sheet P is coarse. Here, the maximum value of the light amount in a plurality of light receiving pixels is used as the monitor light amount, but a statistic (e.g., an average value) for a plurality of light receiving pixels may be used.

Here, the amount of light incident on the image capturing element 35 will be described. In general, when the incident angle of the illumination light with respect to the sheet P is increased (to 45 degrees or more), the light amount of scattered light from the sheet P toward the image capturing element 35 becomes half or less of the light amount of the illumination light guided to the sheet P. The scattered light is directed to the image capturing element 35 after passing through the light receiving optical system provided in the illumination light guide 33 and the image forming optical system 34. Therefore, the light amount of scattered light incident on the effective pixel range A is further attenuated. Therefore, the light amount of the monitor light incident on the effective pixel range B is also reduced to be half or less of the light amount of a light ray guided to the sheet P. That is, the reflection surface 56 is shaped so that the light amount of monitor light incident on the effective pixel range B is substantially equal to the light amount of illumination light incident on the effective pixel range A. This makes it possible to detect variation in the reception level of the image capturing element 35 or variation in the light amount of the monitor light with higher resolution. In the present embodiment, the reflection surface 56 is a reflection surface of a cylinder surface having different optical powers depending on the reflection direction. Therefore, the light amount of monitor light incident on the effective pixel range A is appropriately attenuated. Here, the reflection surface 56 may appropriately attenuate the light amount of monitor light. The reflection surface 56 may be, for example, an aspherically shaped reflection surface, such as an anamorphic surface, a scattering surface, or an attenuating surface. In the present embodiment, in order to detect the light amount of the monitor light with high resolution, the attenuation amount of the reflection surface 56 is set such that an amount of light reflected by the reflection surface 56 is at least half of or less than an amount of light incident to the reflection surface 56. However, since it is sufficient if the variation of the light amount of the monitor light can be detected at a desired resolution, the attenuation amount is appropriately set depending on the required detection accuracy.

[Description of Light Distribution]

Figure 5A:
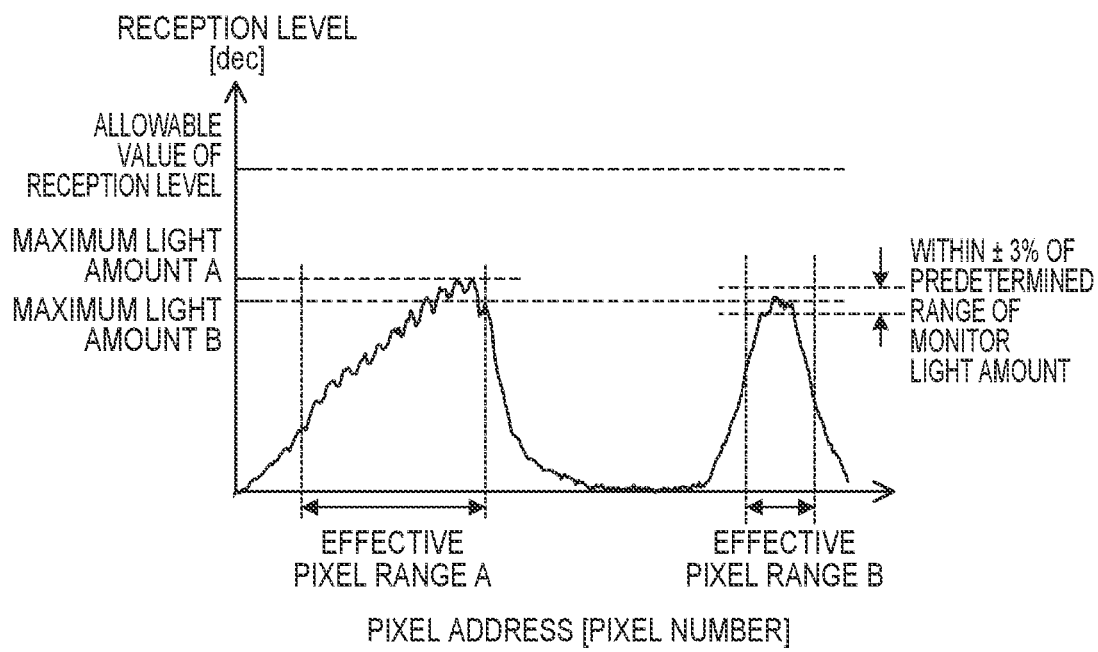
FIGS. 5A to 5D are diagrams for describing output characteristics of an image capturing element.

FIG. 5A is a graph showing an output characteristic of reception levels obtained by performing an imaging operation using a sheet P of a certain type. The horizontal axis represents a pixel position (a pixel address) of the image capturing element 35. The vertical axis represents the reception level. In the effective pixel range A, a part of the scattered light from the sheet P is incident, and each pixel in the effective pixel range A outputs an image signal indicating a reception level. Here, the maximum value of the output value of each pixel in the effective pixel range A is a maximum light amount A. In the effective pixel range B, each pixel outputs an image signal indicating the reception level of the monitor light that is incident through the reflection surface 56. Here, the maximum value of the output value of each pixel in the effective pixel range B is a maximum light amount B.

As shown in FIG. 5A, the maximum light amount A and the maximum light amount B are similar to each other. Further, the maximum light amount A and the maximum light amount B are equal to or less than an allowable value. The allowable value is a reception level determined in advance so that the image signal is not saturated.

[Adjustment of Light Amount of Light Source 31]

When the light amount of the light source 31 becomes excessive, reflected light from the sheet P increases. In such a case, overexposure or the like may occur on the surface of the sheet P obtained by the image capturing element 35. Therefore, a correct characteristic value of a surface property cannot be obtained. On the other hand, if the light amount is insufficient, the light reflected from the sheet P becomes too small, and a correct surface property characteristic value cannot be obtained. As the temperature of the light source 31 rises, the light emission amount decreases. Further, when the light source 31 becomes old, the light emission amount also decreases. Therefore, the drive current ILED (in other words, the amount of light emitted by the light source 31), is adjusted so that the amount of light received by the monitor light becomes the target amount of light.

It is possible for the light amount of the light source 31 to change every time one sheet P is imaged. Therefore, a correction of the amount of light may be performed every time one sheet P is imaged. In the present embodiment, most portions of the optical path for guiding the monitor light are provided inside the optical component 37. That is, a second optical path 62 is present only between the electric substrate 38 and the conveyance front surface 54 of the optical component 37 in the Z-axis direction. Therefore, between the optical component 37 and the sheet P in the Z-axis direction, there is no optical path through which the monitor light passes. Therefore, the light amount of the monitor light is not affected by the sheet P. That is, the detection of the monitor light and imaging of the sheet P can be performed concurrently.

The control unit 10 can detect the rate of variation of the light amount of the light source 31 due to temperature or change over time by detecting the variation of the light amount of the monitor light. Further, detection of the monitor light which is performed by the effective pixel range B and an imaging operation of the surface image of a sheet P which is performed by the effective pixel range A can be performed concurrently. Therefore, a correction of the amount of light may be performed every time one sheet P is imaged. Here, the correction of the amount of light is performed every time one sheet P is imaged, but this is merely an example. The correction of the amount of light may be performed for each of a plurality of sheets P. An execution condition of a light amount correction can be appropriately set in accordance with the required accuracy of the characteristic value of the surface property.

[Flowchart]

Figure 6A:
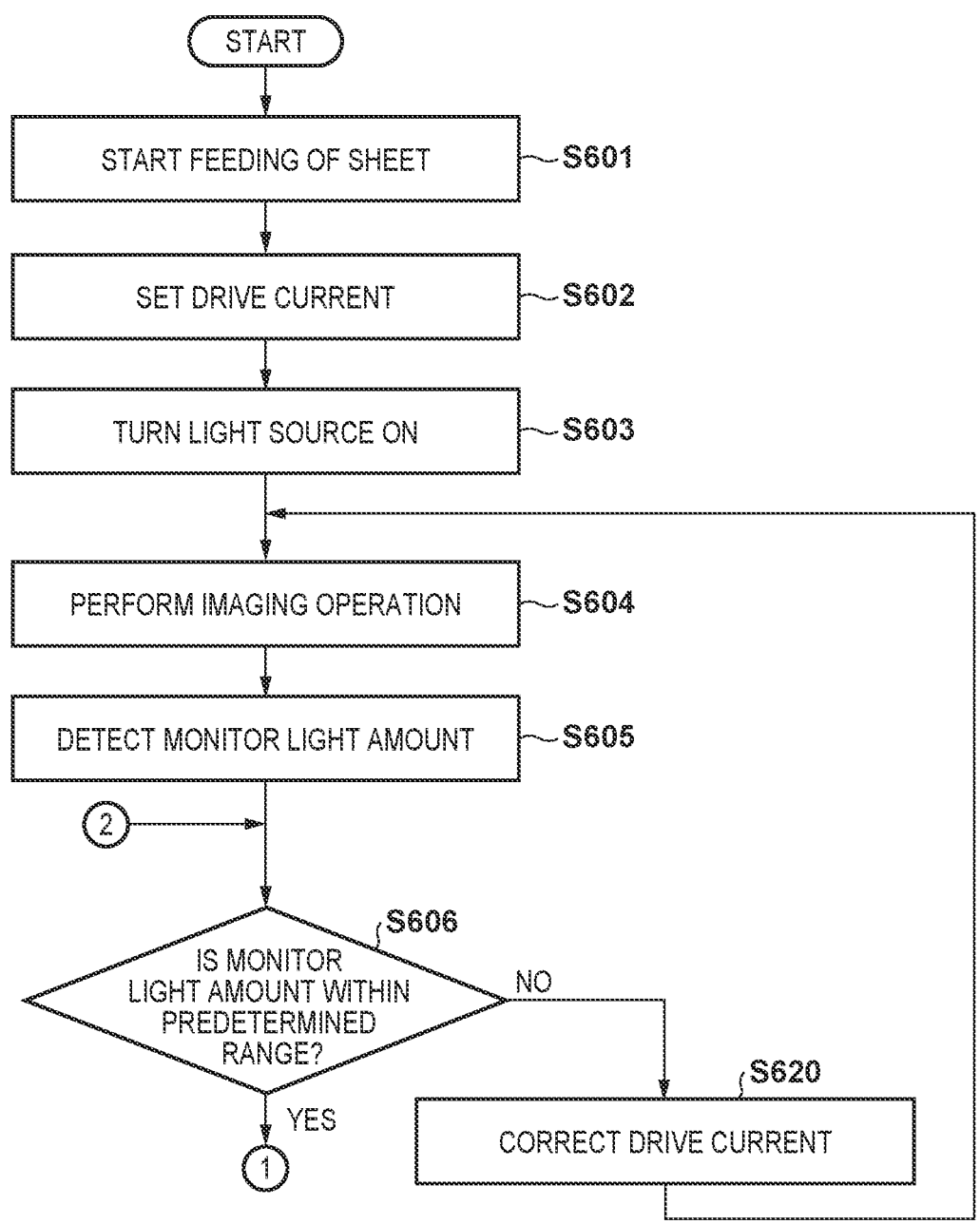

FIGS. 6A and 6B are a flowchart showing an image forming method that includes light amount correction. This image forming method is performed by the control unit 10.

Measurement Start Timing

In the present embodiment, a pulse motor is employed as the motor 3. For example, the motor 3 conveys the sheet P at a conveyance speed of 100 mm/sec. The monitoring unit 209 of the control unit 10 monitors the position of the sheet P in the conveyance path based on a detection signal of the sheet sensor 22 and the number of pulses (number of steps) supplied to the motor 3. The number of steps and the conveying distance of the sheet P are in a proportional relationship. By counting the number of steps using the counter 210, the monitoring unit 209 predicts the distance from the registration roller pair 6 to the leading edge of the sheet P based on the number of steps. The determination unit 211 resets the counter to 0 when the leading edge of the sheet P is detected by the sheet sensor 22. When the count value (the number of steps) becomes a predetermined value (e.g., 100 steps), the determination unit 211 determines that the sheet P has arrived at the detection position of the sheet determination device 30. The predetermined value is calculated from the rotation angle per step by the motor 3 and the outer diameter of the registration roller pair 6. The motor 3 is not limited to a pulse motor. For example, a DC (direct current) motor having an encoder for counting the number of rotations may be employed. Although a pulse motor is employed to monitor the position of the sheet P, the position of the sheet P may be monitored from other parameters. For example, when the sheet sensor 22 detects the leading edge of the sheet P, the monitoring unit 209 starts timing by a timer. The determination unit 211 may cause the sheet determination device 30 to perform a determination for the sheet P when the timer has measured a predetermined amount of time.

The control unit 10 may be configured based on the CPU 200 and control programs, or may be implemented by an application specific integrated circuit (ASIC). The CPU 200 and an ASIC may execute processing in a shared manner.

Image Forming Method

In step S601, the control unit 10 (conveyance control unit 201) starts feeding a sheet P. The control unit 10 starts driving the motor 3 to thereby cause the motor 3 to rotate the feeding roller 4, the conveyance roller pair 5, and the registration roller pair 6. As a result, conveyance of the sheet P is started.

In step S602, the control unit 10 (light source control unit 203) sets the value of the drive current ILED of the light source 31 to a reference value Iref. The reference value Iref is set in the light source driving unit 32. Here, the reference value Iref is decided in advance for example at a time of shipping the image forming apparatus 1 from a factory. More specifically, the reference value Iref is decided so that the sheet determination device 30 images the sheet P or the reference plate which serves as a reference, and the reception level in the effective pixel range A becomes a target level. The reference value Iref is stored in a storage unit of the control unit 10. The monitor light amount measured when the sheet P or the reference plate which serves as a reference is imaged is referred to as a reference monitor light amount. The reference monitor light amount is also stored in the memory 212 of the control unit 10. In the present embodiment, a reference monitor light amount stored in a ROM area of the memory 212 in advance at the time of factory shipment or the like is used, but any value with which the light reception level is not saturated may be used as the reference monitor light amount. For example, a value that was set when a sheet P was imaged in the past may be adopted as the reference monitor light amount.

In step S603, the control unit 10 (light source control unit 203) outputs a lighting instruction to the light source driving unit 32, to turn on the light source 31. In step S604, the control unit 10 (the image capturing control unit 202) outputs a trigger signal to the image capturing element 35 to perform an imaging operation. In step S605, the control unit 10 detects the monitor light amount based on an image signal outputted from the effective pixel range B of the image capturing element 35.

Figure 5B:
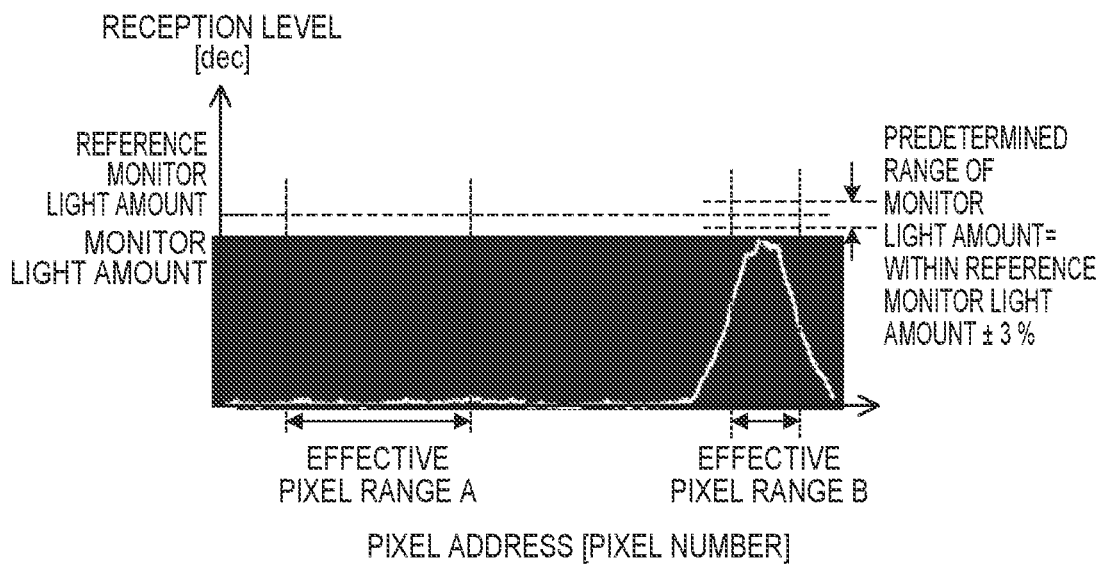

In step S606, the control unit 10 (light source control unit 203) determines whether the detected monitor light amount is within a predetermined range. For example, as shown in FIG. 5B, the upper limit value of the predetermined range may be the reference monitor light amount×1.03, and the lower limit value of the predetermined range may be the reference monitor light amount×0.97. That is, the predetermined range (target range) is a range within ±3% of the reference monitor light amount. If the monitor light amount falls within the predetermined range, the control unit 10 proceeds to step S607. In contrast, if the monitor light amount does not fall within the predetermined range, the control unit 10 proceeds to step S620.

In step S620, the control unit 10 (correction unit 204) corrects the drive current ILED based on the monitor light amount. For example, the control unit 10 may correct the drive current ILED by using Equation (1).

$$\text{ILED (after correction)} = (\text{reference monitor light amount} \div \text{monitor light amount}) \times \text{ILED (before correction)} \quad (1)$$

The control unit 10 proceeds from step S620 to step S604 and performs step S604 to step S606 again. If the monitor light amount ultimately does not fall within the predetermined range, the control unit 10 proceeds to step S607.

In step S607, the control unit 10 (determination unit 211) determines whether the sheet P has arrived at a position that the sheet determination device 30 can detect. As described above, the control unit 10 monitors the position of the sheet P using a counter or a timer. When the sheet P arrives at the position that the sheet determination device 30 can detect, the control unit 10 proceeds to step S608.

In step S608, the control unit 10 (the image capturing control unit 202) outputs a trigger signal to the image capturing element 35 to perform an imaging operation. In step S609, the control unit 10 (the image capturing control unit 202) detects the monitor light amount based on an image signal outputted from the effective pixel range B of the image capturing element 35.

Figure 5C:
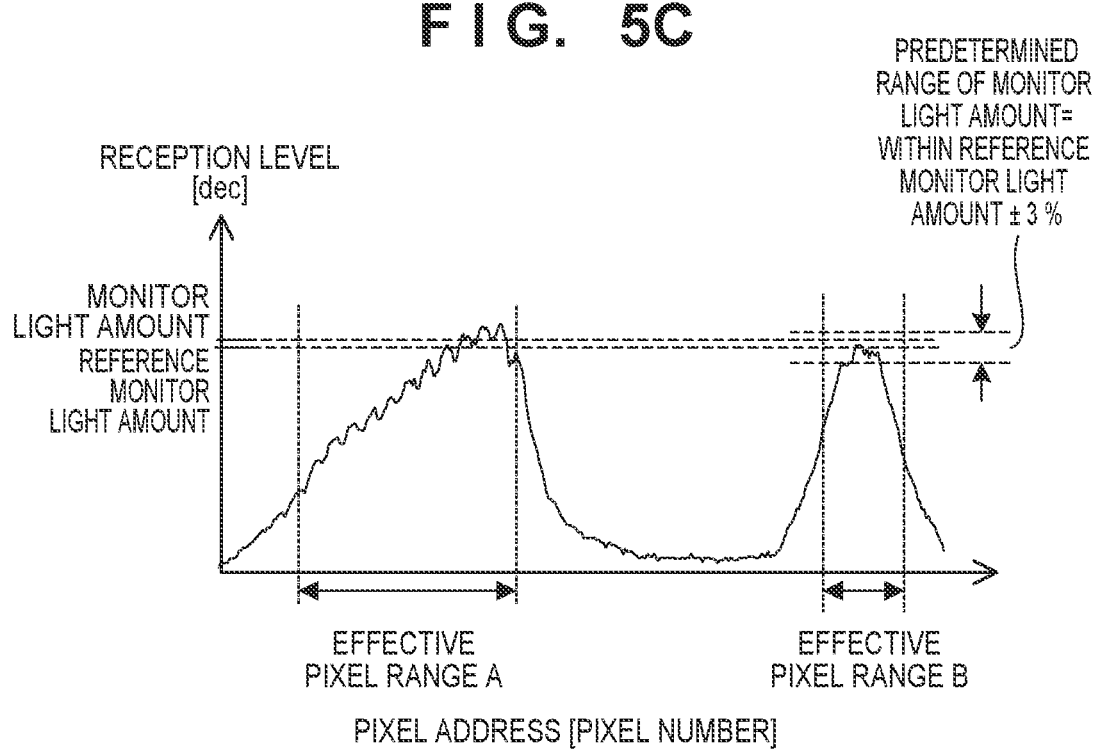

As shown in FIG. 5C, it is understood that the monitor light amount is corrected to be within the predetermined range. Further, it is understood that the reflected light from the sheet P caused by the illumination light is detected in the effective pixel range A.

In step S610, the control unit 10 (characteristic calculation unit 205) calculates a characteristic value of the surface property based on the amount of light acquired by the effective pixel range A. This calculation method is already known to a person skilled in the art, and therefore a description thereof is omitted here. The determination unit 206 may determine the type of the sheet P based on the characteristic value.

In step S611, the control unit 10 (the condition deciding unit 207) decides an image forming condition based on the characteristic value or a type of sheet P. For example, a storage unit (the memory 212) of the control unit 10 may store a table for converting the characteristic value into an image forming condition. The control unit 10 converts the characteristic value into an image forming condition by referring to the table.

In step S612, the control unit 10 (the forming control unit 208) controls the image forming unit 50 and forms an image on the sheet P. In step S613, the control unit 10 (the forming control unit 208) determines whether image forming for all sheets P designated by the print job has been completed. When there is a next sheet P on which image formation has not been completed, the control unit 10 sets the next sheet P to a feeding sheet, and advances the processing to step S606. On the other hand, when the image formation on all the sheets P is completed, the control unit 10 ends the series of processing according to the present flowchart.

In the present embodiment, the light amount correction of the light source 31 is performed before the timing at which the leading edge of the sheet P passes through the registration roller pair 6. However, it suffices if the light amount correction of the light source 31 has been completed prior to when the imaging operation (step S608) for obtaining the characteristic value of the surface property of the sheets P is performed.

According to the present embodiment, an amount of light can be obtained without using an inner surface reference plate. Thus, manufacturing cost should be reduced. In addition, it is possible to perform a light amount correction at an arbitrary timing without depending on the conveyance state of the sheet P. The determination accuracy of the sheet P should be improved without reducing the throughput of the image forming apparatus 1.

Second Embodiment

Figure 5D:
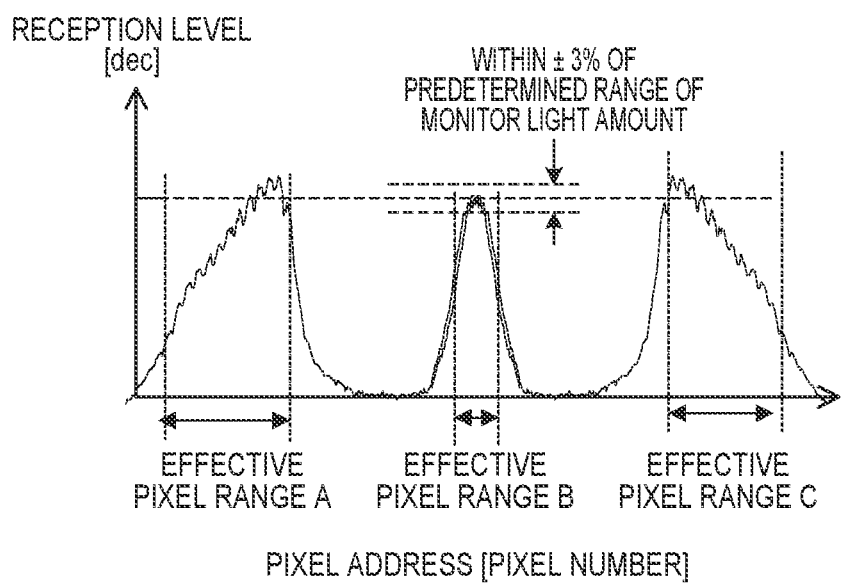
Figure 7:
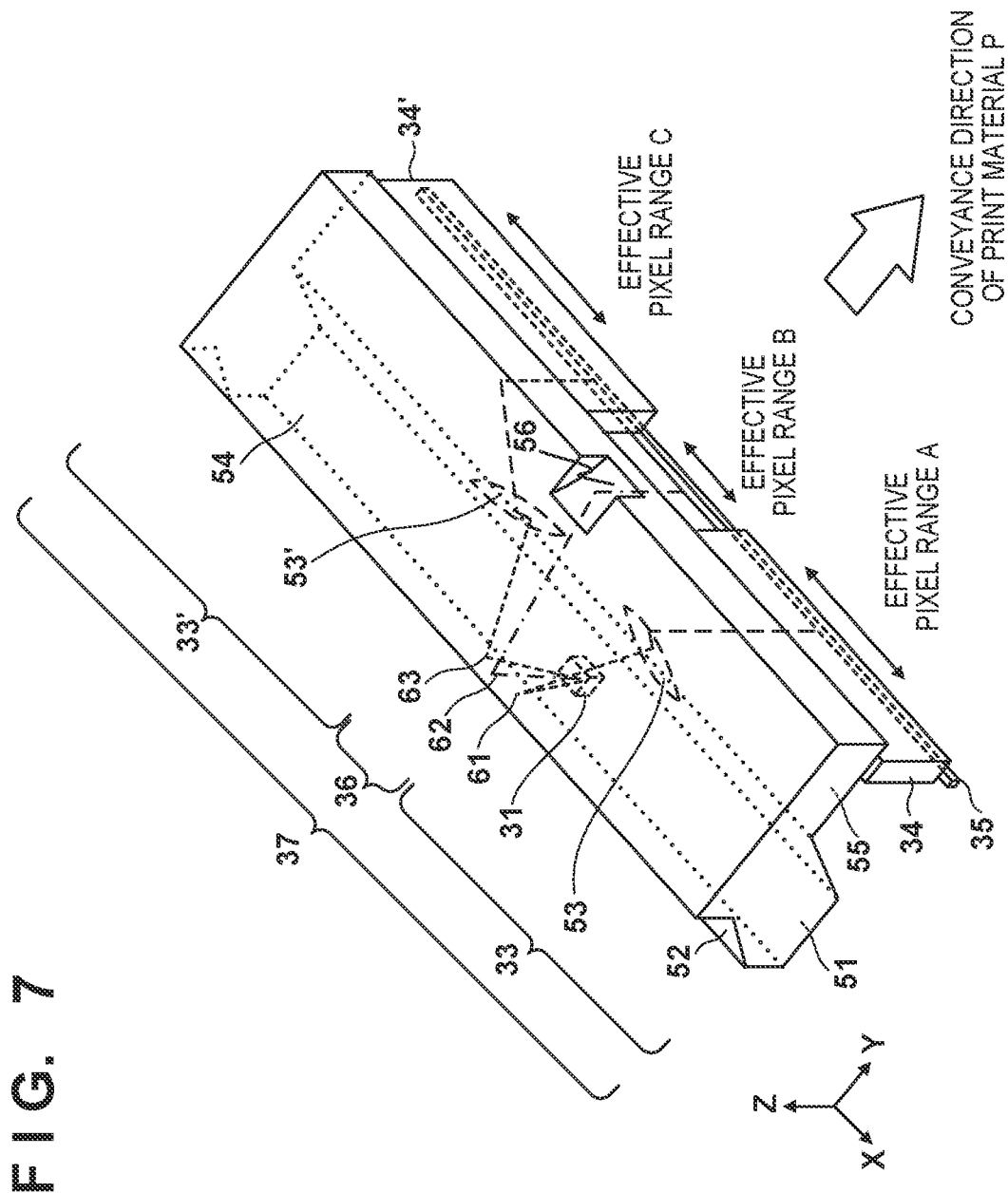
FIG. 7 is a diagram for describing a light guide.

As shown in FIG. 7, in the present embodiment, an optical component 37 having two optical paths for guiding illumination light (a first optical path 61 and a third optical path 63) is proposed. FIG. 5D is a graph showing an output characteristics of the reception levels. Description of matters common to the first embodiment in the second embodiment will be omitted. Since a member configuring the first optical path 61 and a member configuring the third optical path 63 are the same or similar, the reference symbol "'" may be given to a member configuring the third optical path 63.

The third optical path 63 is configured by the incidence surface 51, the reflection surface 52, a reflection surface 53', the conveyance front surface 54, the conveyance back surface 55, and an image forming optical system 34' of the illumination light guide 33'. Part of the light outputted from the light source 31 is incident on the incidence surface 51, is deflected by the reflection surface 52, is further deflected by the reflection surface 53', and is emitted from the conveyance front surface 54 to the outside of the illumination light guide 33'. Here, the incident angle formed by the projection luminous flux of the illumination light and the conveyance direction with respect to the XY plane is 45 degrees. As described above, the incident angle of the first optical path 61 is +45 degrees. Of the illumination light, the reflected light reflected by the sheet P again enters the interior of the illumination light guide 33' from the conveyance front surface 54, and is emitted from the conveyance back surface 55. The light emitted from the conveyance back surface 55 is incident on the effective pixel range C of the image capturing element 35 after passing through the image forming optical system 34'.

Incidentally, when the sheet P is paper, there is a fiber orientation direction (paper grain direction) in a method of manufacturing the paper. The amount of light scattered from the sheet P changes depending on the direction of the paper grain and the angle formed by the illumination luminous flux. That is, when the angle formed between the paper grain direction and the conveyance direction varies, the characteristic value of the surface property does not stabilize, and erroneous determination of the type of the sheet P may occur. Therefore, by making the incident angle of the illumination light that has gone through the first optical path 61 different from the incident angle of the illumination light that has gone through the third optical path 63, the influence of the paper grain direction of the sheet P is reduced and erroneous determination is reduced.

In the illumination optical system according to the present embodiment, the incident angle of the illumination light that has gone through the first optical path 61 and the incident angle of the illumination light that has gone through the third optical path 63 are respectively plus/minus 45 degrees, but this is merely an example. It is possible to appropriately set incident angle in accordance with the type of unevenness of the surface of the sheet P which is a determination target. For example, each of these angles of incidence may be, for example, plus/minus 30 degrees or plus/minus 60 degrees. The control unit 10 calculates the characteristic value of the surface property using the variation of the reception level of the effective pixel range A and the variation of the reception level of the effective pixel range C. As described above, the characteristic value may be calculated based on the variation of the maximum light amount or the average light amount in the entirety of the effective pixel range A and the effective pixel range C.

As FIG. 7 shows, because of the monitor light guide 36, the effective pixel range B is present between the effective pixel range A and the effective pixel range C. As shown in FIG. 5D, three peaks are generated in the reception levels.

In the present embodiment, a case has been described in which there are two optical paths of the illumination light, but three or more optical paths may exist. Depending on the number of optical paths, the number of reflection surfaces 53 increases.

According to the present embodiment, the effective pixel range B for monitoring the amount of light is provided between the two effective pixel ranges A and C for detecting the characteristic value of the surface property of the sheet P. As a result, there is a possibility that the optical component 37 and the image capturing element 35 can be reduced in size. As a result, miniaturization of the sheet determination device 30 can be realized.

Third Embodiment

In the first embodiment and the second embodiment, an integrated optical component 37 is used. In particular, in the illumination light guide 33, it is assumed that the light emitted from the conveyance front surface 54 is reflected by the sheet P and is incident on the conveyance front surface 54 again. However, there is a possibility that the light scattered by any of the reflection surfaces provided in the illumination light guide 33 travels inside the illumination light guide 33 and is incident on the image capturing element 35. Such light may be referred to as stray light. Therefore, the third embodiment aims to reduce the influence of stray light by separating the optical component 37 into two optical components.

Figure 8:
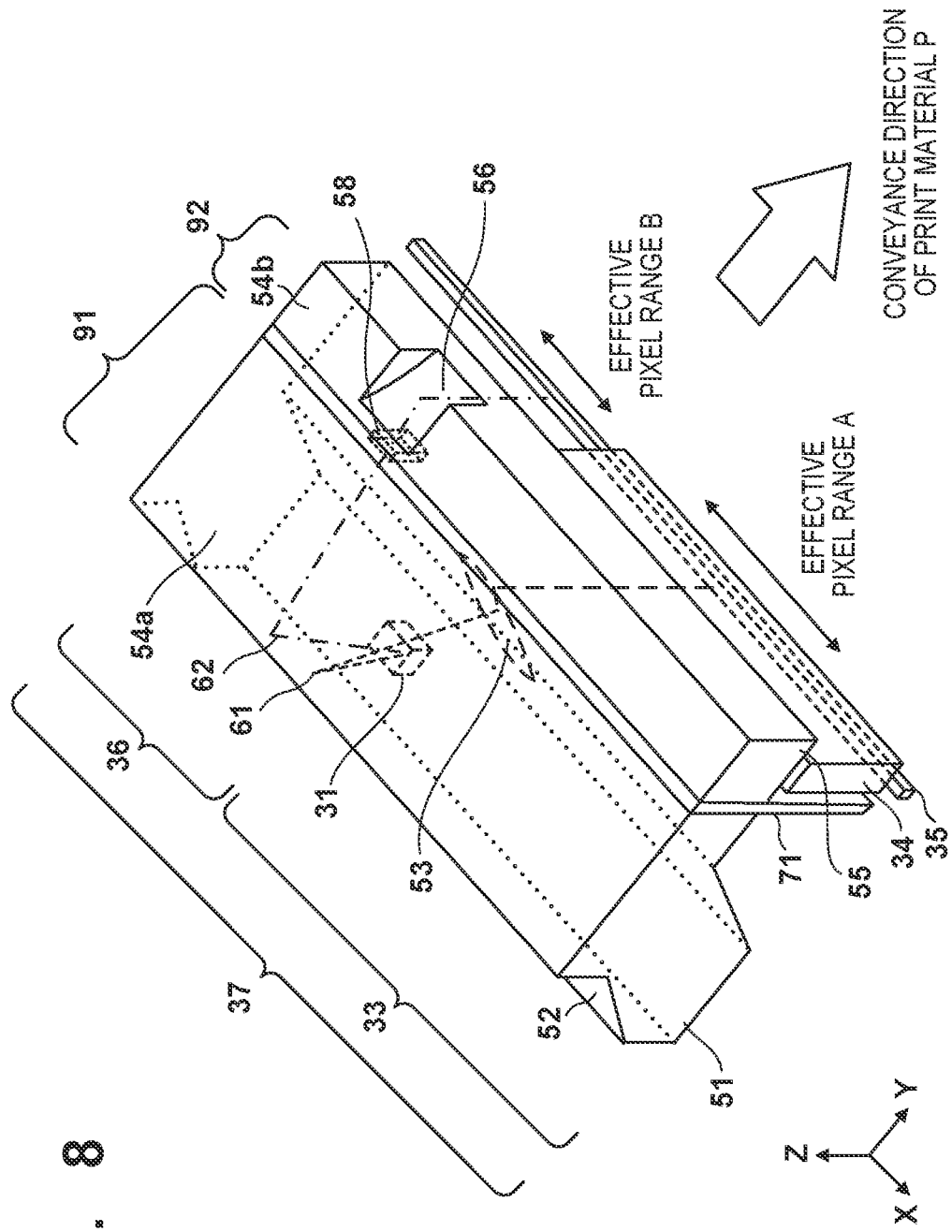
FIG. 8 is a diagram for describing a light guide.

As shown in FIG. 8, the optical component 37 is configured by an optical component 91 and an optical component 92. Note that description of portions that are already described is omitted. The optical component 91, the optical component 92, the image forming optical system 34, and a light shielding plate 71 are held by a housing (not shown). The housing, the optical component 91, the optical component 92, the image forming optical system 34, and the light shielding plate 71 are installed without gaps so that dust, paper powder, or the like does not enter the housing. The conveyance front surface 54 is separated into a conveyance front surface 54a provided in the optical component 91 and a conveyance front surface 54b provided in the optical component 92.

The optical component 91 includes the incidence surface 51, the reflection surfaces 52 and 53, and the conveyance front surface 54. The optical component 92 has a conveyance front surface 54a, a conveyance back surface 55, and a reflection surface 56.

The light shielding plate 71 is, for example, a component formed of resin. The light shielding plate 71 is disposed so as to be sandwiched between the optical components 91 and 92. The light shielding plate 71 removes or reduces unnecessary light (stray light) from the light source 31 and the optical component 91 that goes to the image capturing element 35. In the present embodiment, the light shielding plate 71 is configured by a component different from the housing, but the light shielding plate 71 may be a holding member that holds the optical component 91 and the optical component 92. The holding member may be a part of the housing.

The light shielding plate 71 has a light transmission hole 58 that allows the monitor light in the monitor light guide 36 to pass from the optical component 91 to the optical component 92. That is, the light transmission hole 58 is a through hole that allows light reflected by the reflection surface 52 and directed toward the reflection surface 56 to pass through. The monitor light passing through the light transmission hole 58 is incident on the reflection surface 56 and is deflected. In the present embodiment, the shape of the light transmission hole 58 is a quadrilateral, but this is merely an example. Any shape that allows the monitor light to pass therethrough can be employed. The through hole may be formed from a plurality of slits. The light transmission hole 58 may be satisfied by a member having a light transmitting property. By appropriately setting the light transmittance of this member, the light amount of monitor light incident on the effective pixel range B may be adjusted.

Illumination Light (First Optical Path 61)

As shown in FIG. 8, the illumination light emitted from the light source 31 enters the interior of the illumination light guide 33 (optical component 91) from the incidence surface 51 of the optical component 91, is deflected by the reflection surface 52, and is deflected again by the reflection surface 53. Further, the illumination light is emitted from the conveyance front surface 54 to the outside of the optical component 91, and is irradiated onto a sheet P present as a surface to be irradiated. Part of the scattered light from the sheet P present as a surface to be irradiated again enters the interior of the illumination light guide 33 (optical component 92) from the conveyance front surface 54b provided on the optical component 92 as reflected light caused by the illumination light, and is emitted to the outside of the optical component 92 from the conveyance back surface 55 again. Further, the reflected light caused by the illumination light passes through the image forming optical system 34 and forms an image on an effective pixel range A in the image capturing element 35.

Monitor Light (Second Optical Path 62)

As shown in FIG. 8, the monitor light emitted from the light source 31 enters the inside of the optical component 91 from the incidence surface 51 of the monitor light guide 36 (optical component 91). The monitor light is deflected by the reflection surface 52, passes through the light transmission hole 58, enters the optical component 92, and is incident on the reflection surface 56. The monitor light deflected by the reflection surface 56 is emitted from the conveyance back surface 55 of the optical component 92 to the outside of the monitor light guide 36 (optical component 92). The monitor light is incident on an effective pixel range B in the image capturing element 35.

According to the present embodiment, the optical component 37 is configured by the optical component 91 and the optical component 92, and the light shielding plate 71 is disposed between the optical component 91 and the optical component 92. This makes it difficult for stray light to be incident on the effective pixel range A, the effective pixel range B, or the like. Therefore, it is possible to expect an improvement of the sheet determination accuracy of the sheet determination device 30. In addition, the degree of freedom in the arrangement of the optical component 37 in the sheet determination device 30 should be improved.

Technical Concept Derived from Embodiments

[First Aspect]

As shown in FIGS. 2 to 4, 7, and 8, and the like, the illumination light guide 33 is an example of a first light guide that illuminates a sheet by guiding a first light (illumination light) from out of light outputted from a light source with respect to the sheet. That is, the illumination light guide 33 functions as a first light guide that guides the first light, out of the light irradiated from the light source with respect to the sheet, through the first light guiding path. The effective pixel ranges A and C of the image capturing element 35 function as a first detection unit (imaging unit) that receives reflected light from the sheet and outputs an image signal indicating an image of a surface of the sheet. The effective pixel range B functions as a detection unit that receives second light (monitor light) from out of the light outputted from the light source and outputs a detection signal according to the light amount of the monitor light. That is, the effective pixel range B functions as a second detection unit that receives the second light and outputs a detection signal corresponding to the light amount of the second light. The monitor light guide 36 functions as a second light guide for guiding the monitor light, out of the light outputted from the light source, to the detection unit. That is, the monitor light guide 36 functions as a second light guide that guides the second light, which is different from the first light among the light irradiated from the light source, in a second light guiding path that is different from the first light guiding path. The control unit 10 functions as a control unit that controls a light emission amount of the light source based on the detection signal. The first optical path 61 (first light guiding path) which is formed by the first light guide for guiding the illumination light from the light source to the sheet differs from the second optical path 62 (second light guiding path) which is formed by the second light guide for guiding the monitor light from the light source to the detection unit. By employing such a first light guide and a second light guide, a light amount can be obtained without using an inner surface reference plate.

[Second Aspect]

The first light guide and the second light guide may be integrated light guide components (e.g., the optical component 37). This should reduce the number of parts and simplify the mounting work.

[Third Aspect]

The light amount of monitor light incident on the detection unit may be equal to or less than half of the light amount of illumination light incident on the sheet. As a result, it should be possible to detect the light amount of the monitor light with a high resolution.

[Fourth Aspect]

The first light guide may include at least one reflection surface (e.g., reflection surfaces 52 and 53) for bending a portion of the first optical path. This should increase the degree of freedom in the shape of the first light guide.

[Fifth Aspect]

The at least one reflection surface (e.g., reflection surface 53) may be a reflection surface formed to collimate incident light. Since the illumination light becomes collimated luminous flux, the surface property of the sheet material should be efficiently detected.

[Sixth Aspect]

The second light guide may have a reflection surface (e.g., reflection surface 56) that functions as a scattering surface or an attenuating surface. This should effectively reduce the light amount of monitor light.

[Seventh Aspect]

The reflection surface provided on the second light guide may be a curved surface. This should effectively reduce the light amount of monitor light.

[Eighth Aspect]

The curved surface may be an aspherical surface having different optical powers depending on a reflection direction. This should effectively reduce the light amount of monitor light.

[Ninth Aspect]

The aspherical surface may be a cylinder surface or an anamorphic surface. This should effectively reduce the light amount of monitor light.

[Tenth Aspect]

The reflection surface provided on the second light guide (for example, the reflection surface 56) may be a total reflection surface. This should reduce the attenuation of the monitor light. In cases where the light amount of monitor light tends to be insufficient, a total reflection surface may be advantageous.

[Eleventh Aspect]

The reflection surface provided on the second light guide may attenuate the monitor light and guide the monitor light to the detection unit. As a result, it should be possible to detect the light amount of the monitor light with a high resolution.

[Twelfth Aspect]

The imaging unit and the detection unit may be the same image capturing element. This should reduce the number of parts and decrease the mounting work.

[Thirteenth Aspect]

The image capturing element may include a plurality of light receiving elements (e.g., effective pixel ranges A, B, and C) arranged in at least a line. The first light receiving element group (e.g., effective pixel ranges A and C) of the plurality of light receiving elements may function as an imaging unit. The second light receiving element group (e.g., effective pixel range B) of the plurality of light receiving elements may function as a detection unit.

[Fourteenth Aspect]

A third light receiving element group (e.g., effective pixel range C) of the plurality of light receiving elements may function together with the first light receiving element group as an imaging unit. As a result, the influence of uneven light distribution of the optical component 37 should be reduced. In addition, the influence of the paper grain of a sheet P should be reduced.

[Fifteenth Aspect]

As shown in FIG. 7, the third light receiving element group may be disposed between the first light receiving element group and the second light receiving element group. This should allow the size of the optical component 37 to be reduced.

[Sixteenth Aspect]

The first light guide may have the following elements. The incidence surface 51 is an example of a first incidence surface that faces the light source. The reflection surface 52 is an example of a first deflection surface that deflects the illumination light that entered the first light guide through the first incidence surface. The reflection surface 53 is an example of a second deflection surface for deflecting the illumination light deflected by the first deflection surface. The conveyance front surface 54 is an example of a first emission surface which is disposed facing the conveyance path of the sheet and emits the light deflected by the second deflection surface to the conveyance path. Further, the conveyance front surface 54 may be disposed so as to face the conveyance path of the sheet, and function as a second incidence surface onto which reflected light from the sheet is incident. The conveyance back surface 55 is an example of a second emission surface that emits reflected light that entered the first light guide through the second incidence surface.

[Seventeenth Aspect]

The image forming optical system 34 is an example of an image formation unit for forming an image of reflected light emitted from the second emission surface onto the imaging unit. This should enable an accurate image showing the surface of the sheet P to be obtained.

[Eighteenth Aspect]

As shown in FIG. 8, the first light guide (e.g., illumination light guide 33) may include a first light guide component (e.g., the optical component 91) and a second light guide component (e.g., the optical component 92). The first light guide component may have a first incidence surface (e.g., the incidence surface 51), a first deflection surface (e.g., the reflection surface 52), and a second deflection surface (e.g., the reflection surface 53). The second light guide component (e.g., the monitor light guide) may have a second incidence surface (e.g., the conveyance front surface 54b) and a second emission surface (e.g., the conveyance back surface 55).

[Nineteenth Aspect]

The light shielding plate 71 is an example of a first light shielding member disposed between the first light guide component and the second light guide component. Thus, stray light that occurs between the first light guide component and the second light guide component should be reduced.

[Twentieth Aspect]

The second light guide may have the following elements. The incidence surface 51 is an example of a third incidence surface that faces the light source. The reflection surface 52 is an example of a third deflection surface that deflects the monitor light that entered the second light guide through the third incidence surface. The reflection surface 56 is an example of a fourth deflection surface for deflecting the monitor light deflected by the third deflection surface. The conveyance back surface 55 is an example of a third emission surface which is disposed parallel to the conveyance path of the sheet and emits the light deflected by the fourth deflection surface toward the detection unit.

[Twenty-First Aspect]

As shown in FIG. 8, the second light guide may include a third light guide component (e.g., the optical component 91) and a fourth light guide component (e.g., the optical component 92). In this case, the third light guide component may have a third incidence surface (e.g., the incidence surface 51) and a third deflection surface (e.g., the reflection surface 52). The fourth light guide component (e.g., the optical component 92) may have a fourth deflection surface (e.g., the reflection surface 56) and a third emission surface (e.g., the conveyance back surface 55).

[Twenty-Second Aspect]

As shown in FIG. 8, the light shielding plate 71 functions as a second light shielding member disposed between the third light guide component and the fourth light guide component. The second light shielding member may have a through hole through which the monitor light deflected by the third deflection surface passes (e.g., the light transmission hole 58). This should reduce unnecessary light without blocking the monitor light.

[Twenty-Third Aspect]

As described in connection with step S608 or step S609, the reception of the reflected light from the sheet by the imaging unit and the reception of the monitor light by the detection unit may be performed simultaneously. This should make it possible to perform sheet determination and correction of the light amount of the light source while suppressing a decrease in the throughput of the image forming apparatus 1.

[Twenty-Fourth Aspect]

The sheet determination device 30 may include a sheet image capturing apparatus (e.g., the light source 31, the image capturing element 35, and the optical component 37), and a determination unit (e.g., the control unit 10) that determines the type of a sheet (e.g., a type related to a surface property) based on the amount of light acquired by the sheet image capturing apparatus.

[Twenty-Fifth Aspect]

The image forming apparatus 1 may include a sheet image capturing apparatus, a deciding unit (e.g., the control unit 10), and an image forming unit (e.g., the image forming unit 50). The image forming apparatus 1 may include the sheet determination device 30, a deciding unit (e.g., the control unit 10), and an image forming unit (e.g., the image forming unit 50). The deciding unit may determine the image forming condition based on the image signal acquired by the sheet image capturing apparatus. For example, the deciding unit (e.g., the control unit 10) may determine the image forming condition based on the type relating to the surface property of the sheet determined by the sheet determination device 30. The image forming unit (for example, the image forming unit 50) forms an image on a sheet according to an image forming condition. As a result, an image should be appropriately formed according to the type of the sheet.

Various numerical values have been illustrated, but all are merely examples. The terms parallel and orthogonal are also not used in a strict sense. "Parallel" comprises being approximately parallel. "Orthogonal" comprises being approximately orthogonal.

The present invention is not limited to the embodiments described above, and various modifications and variations are possible without departing from the spirit and scope of the invention. Accordingly, the claims are appended hereto in order to make the scope of the invention public.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-073719, filed Apr. 8, 2019 which is hereby incorporated by reference herein in its entirety.

What is claimed is:

1. A light guide comprising:
   a first light guide portion configured to guide first light in a first light guiding path, the first light being of light irradiated from a light source to an irradiation target body; and
   a second light guide portion configured to guide second light in a second light guiding path different from the first light guiding path, the second light being of the light irradiated from the light source and different from the first light,
   wherein the first light guide portion includes at least one reflection surface configured to cause a portion of the first light guiding path to be bent,
   the first light guided by the first light guide portion is received by a first detection portion via the irradiation target body, and
   the second light guided by the second light guide portion is received by a second detection portion without via the irradiation target body.

2. The light guide according to claim 1, wherein the first light guide portion and the second light guide portion are integrated in a single light guide component.

3. The light guide according to claim 1, wherein a light amount of the second light outputted from the second light guide portion is a half or less than a light amount of the first light outputted from the first light guide portion.

4. The light guide according to claim 1, wherein the at least one reflection surface is formed to collimate incident light.

5. The light guide according to claim 1, wherein the second light guide portion includes a reflection surface that functions as a scattering surface or an attenuating surface.

6. The light guide according to claim 5, wherein the reflection surface provided on the second light guide portion is a curved surface.

7. The light guides according to claim 6, wherein the curved surface is an aspherical surface having different optical powers depending on a reflection direction.

8. The light guide according to claim 7, wherein the aspherical surface is a cylinder surface or an anamorphic surface.

9. The light guide according to claim 5, wherein the reflection surface provided on the second light guide portion is a total reflection surface.

10. The light guide according to claim 5, wherein the reflection surface provided on the second light guide attenuates the second light and guides the second light to the second detection portion.

11. The light guide according to claim 1, wherein the first light guide portion includes:
a first incidence surface that faces the light source,
a first deflection surface configured to deflect the first light incident on the first light guide portion through the first incidence surface,
a second deflection surface configured to deflect the first light deflected by the first deflection surface,
a first emission surface that is disposed facing the irradiation target body and emits the light deflected by the second deflection surface to the irradiation target body,
a second incidence surface, which is disposed to face the irradiation target body and on which reflected light from the irradiation target body is incident, and
a second emission surface configured to emit the reflected light incident on the first light guide portion through the second incidence surface.

12. The light guide according to claim 11, wherein
the first light guide portion includes a first light guide component and a second light guide component,
the first light guide component includes the first incidence surface, the first deflection surface, and the second deflection surface, and
the second light guide component includes the second incidence surface and the second emission surface.

13. The light guide according to claim 12, further comprising a first light shielding member disposed between the first light guide component and the second light guide component.

14. The light guide according to claim 1, wherein the second light guide portion includes:
a third incidence surface that faces the light source,
a third deflection surface configured to deflect the second light incident on the second light guide through the third incidence surface,
a fourth deflection surface configured to deflect the second light deflected by the third deflection surface, and
a third emission surface configured to emit the light deflected by the fourth deflection surface towards a detection portion.

15. The light guide according to claim 14, wherein
the second light guide portion includes a third light guide component and a fourth light guide component,
the third light guide component includes the third incidence surface and the third deflection surface, and
the fourth light guide component includes the fourth deflection surface and the third emission surface.

16. The light guide according to claim 15, further comprising:
a second light shielding member disposed between the third light guide component and the fourth light guide component,
wherein the second light shielding member has a through hole through which the second light deflected by the third deflection surface passes.

17. A sheet imaging apparatus comprising:
the light guide recited in claim 1;
the light source;
the first detection portion configured to receive reflected light from a sheet and output a first signal corresponding to a surface of the sheet;
the second detection portion configured to receive the second light and output a second signal corresponding to a light amount of the second light; and
a control unit configured to control a light emission amount of the light source based on the second signal.

18. A sheet determining apparatus comprising:
a sheet imaging device that images a sheet;
a determination portion that determines a type of the sheet based on a first signal obtained by the sheet imaging device;
the light guide recite in claim 1;
the light source;
the first detection portion configured to receive reflected light from the sheet and output the first signal corresponding to a surface of the sheet;
the second detection portion configured to receive the second light and output a second signal corresponding to a light amount of the second light; and
a control unit configured to control a light emission amount of the light source based on the second signal.

19. An image forming apparatus comprising:
a sheet imaging device that images a sheet;
a determination portion that determines a type of the sheet based on a first signal obtained by the sheet imaging device;
an image forming unit that forms an image on the sheet;
the light guide recited in claim 1;
the light source;
the first detection portion configured to receive reflected light from the sheet and output the first signal corresponding to a surface of the sheet;
the second detection portion configured to receive the second light and output a second signal corresponding to a light amount of the second light; and
a control unit configured to control a light emission amount of the light source based on the second signal.

20. A light guide comprising:
a first light guide portion configured to guide first light in a first light guiding path, the first light being of light irradiated from a light source to an irradiation target body; and
a second light guide portion configured to guide second light in a second light guiding path different from the first light guiding path, the second light being of the light irradiated from the light source and different from the first light,
wherein the first light guide portion includes at least one reflection surface configured to cause a portion of the first light guiding path to be bent,
wherein the first light guide portion includes:
a first incidence surface that faces the light source,
a first deflection surface configured to deflect the first light incident on the first light guide portion through the first incidence surface, a second deflection surface configured to deflect the first light deflected by the first deflection surface, a first emission surface that is disposed facing the irradiation target body and emits the light deflected by the second deflection surface to the irradiation target body, a second incidence surface, which is disposed to face the irradiation target body and on which reflected light from the irradiation target body is incident, and a second emission surface configured to emit the reflected light incident on the first light guide portion through the second incidence surface.

21. The light guide according to claim 20, wherein the first light guide portion and the second light guide portion are integrated in a single light guide component.

22. The light guide according to claim 20, wherein the at least one reflection surface is formed to collimate incident light.

23. The light guide according to claim 20, wherein the second light guide portion includes a reflection surface that functions as a scattering surface or an attenuating surface.

24. The light guide according to claim 20, wherein
the first light guide portion includes a first light guide component and a second light guide component,
the first light guide component includes the first incidence surface, the first deflection surface, and the second deflection surface, and
the second light guide component includes the second incidence surface and the second emission surface.

25. The light guide according to claim 20, further comprising a first light shielding member disposed between the first light guide component and the second light guide component.

26. The light guide according to claim 20, wherein the second light guide portion includes:
a third incidence surface that faces the light source,
a third deflection surface configured to deflect the second light incident on the second light guide through the third incidence surface,
a fourth deflection surface configured to deflect the second light deflected by the third deflection surface, and
a third emission surface configured to emit the light deflected by the fourth deflection surface towards a detection portion.

27. The light guide according to claim 26, wherein
the second light guide portion includes a third light guide component and a fourth light guide component,
the third light guide component includes the third incidence surface and the third deflection surface, and
the fourth light guide component includes the fourth deflection surface and the third emission surface.

28. The light guide according to claim 27, further comprising:
a second light shielding member disposed between the third light guide component and the fourth light guide component, wherein the second light shielding member has a through hole through which the second light deflected by the third deflection surface passes.

29. A light guide comprising:
a first light guide portion configured to guide first light in a first light guiding path, the first light being of light irradiated from a light source to an irradiation target body; and a second light guide portion configured to guide second light in a second light guiding path different from the first light guiding path, the second light being of the light irradiated from the light source and different from the first light, wherein the first light guide portion includes at least one reflection surface configured to cause a portion of the first light guiding path to be bent, the second light guide portion includes:

an incidence surface that faces the light source, a first deflection surface configured to deflect the second light incident on the second light guide through the incidence surface, a second deflection surface configured to deflect the second light deflected by the first deflection surface, and an emission surface configured to emit the light deflected by the second deflection surface towards a detection portion.

30. The light guide according to claim 29, wherein the first light guide portion and the second light guide portion are integrated in a single light guide component.

31. The light guide according to claim 29, wherein the at least one reflection surface is formed to collimate incident light.

32. The light guide according to claim 29, wherein the second light guide portion includes a reflection surface that functions as a scattering surface or an attenuating surface.

33. The light guide according to claim 29, wherein the second light guide portion includes a first light guide component and a second light guide component,
the first light guide component includes the incidence surface and the first deflection surface, and
the second light guide component includes the second deflection surface and the emission surface.

34. The light guide according to claim 33, further comprising:
a second light shielding member disposed between the first light guide component and the second light guide component,
wherein the second light shielding member has a through hole through which the second light deflected by the first deflection surface passes.

* * * * *